March 31, 1953 M. WELSTEIN 2,633,064
CONTAINER MAKING MACHINE
Filed Dec. 8, 1949 4 Sheets-Sheet 1
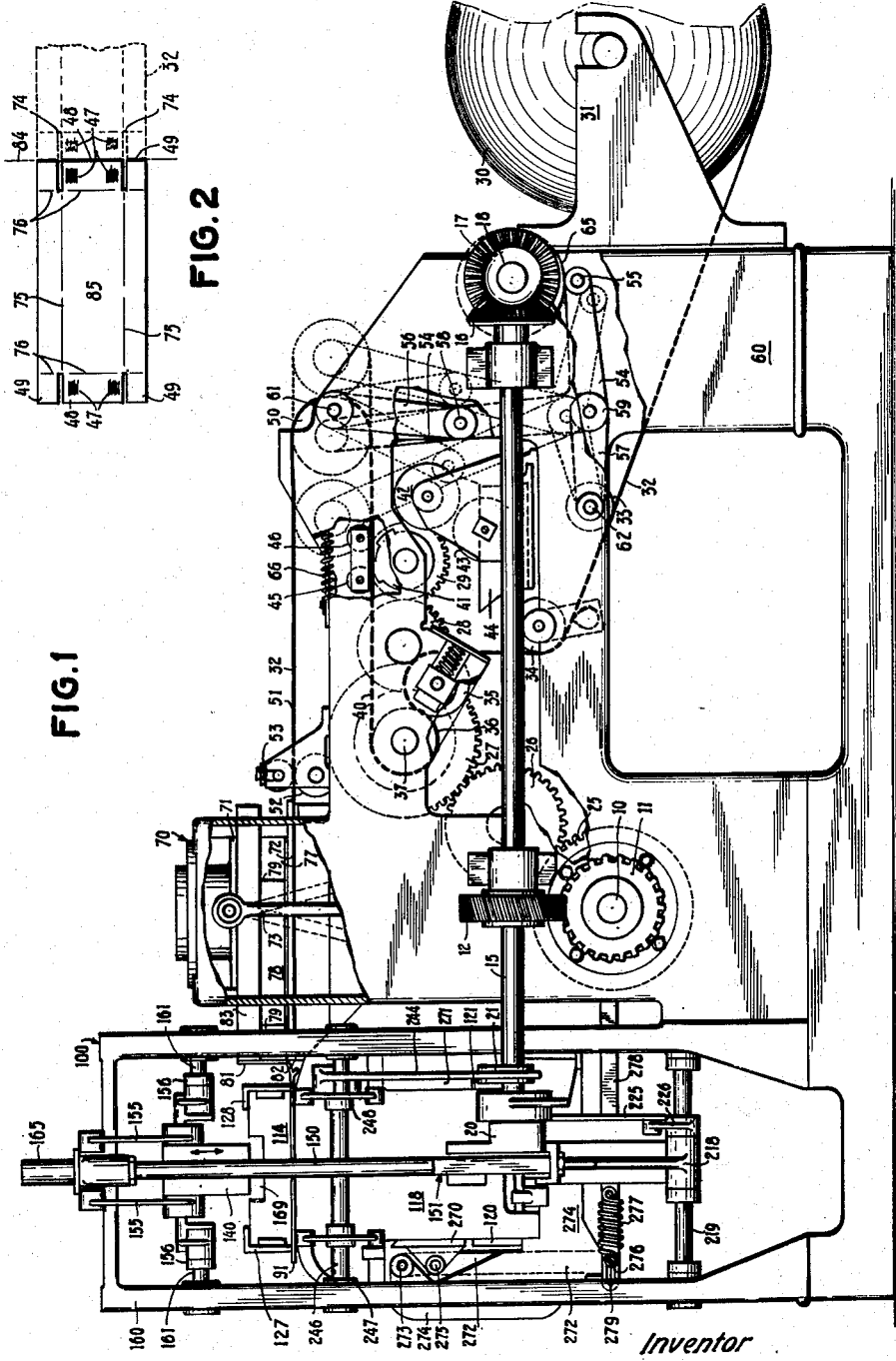
Inventor
MICHEL WELSTEIN
By: Hugh A. Kirk
His Attorney

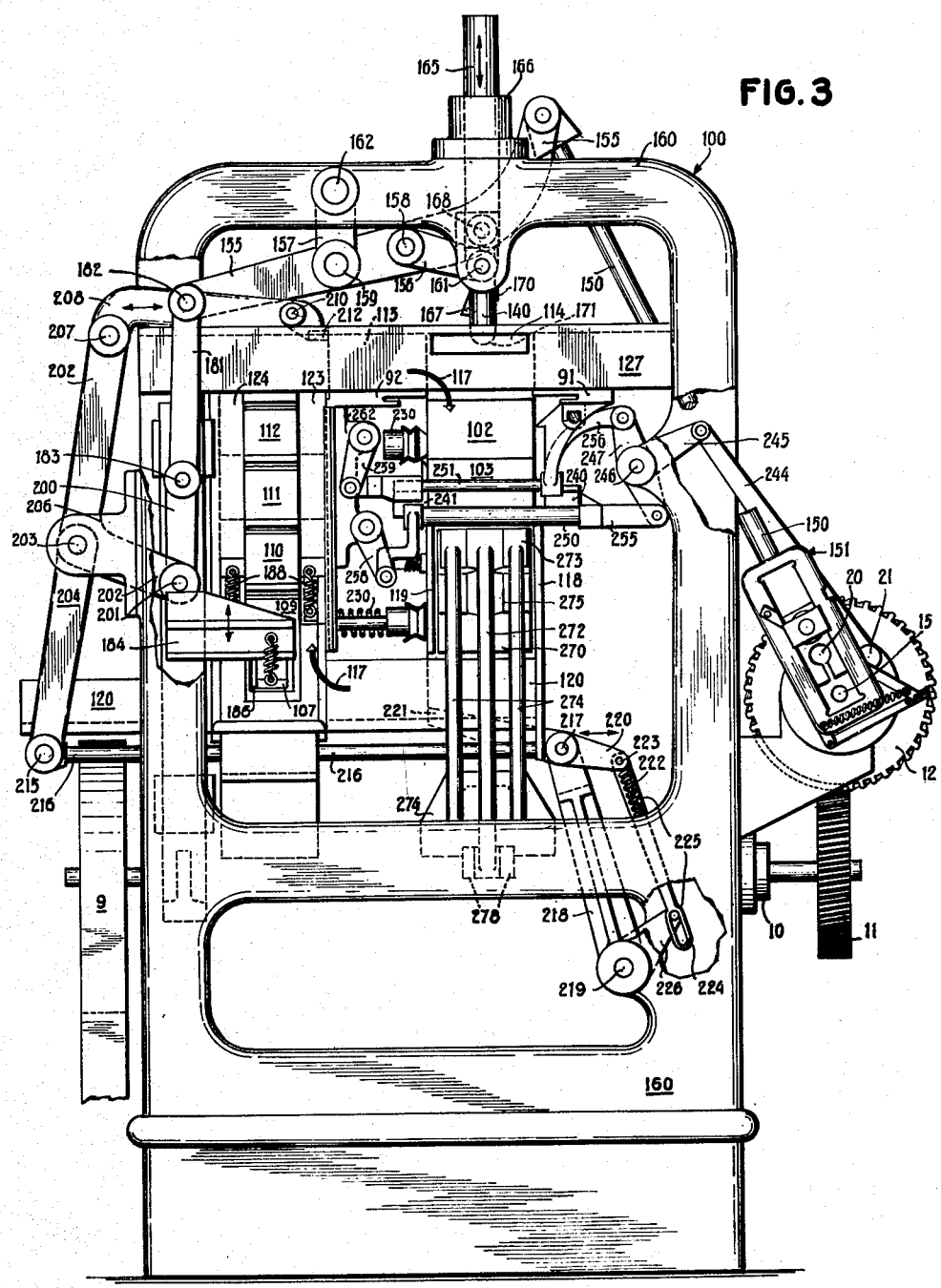

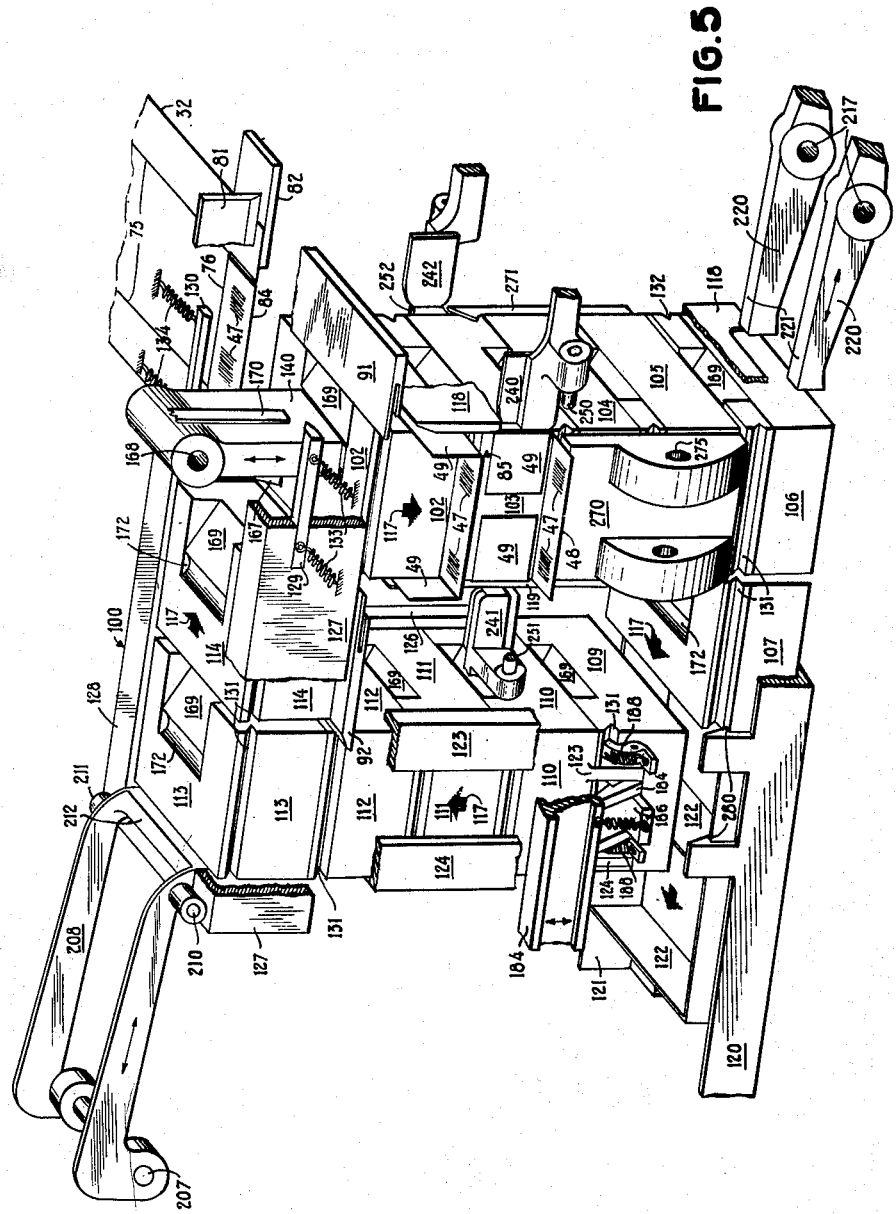

Patented Mar. 31, 1953

2,633,064

UNITED STATES PATENT OFFICE 2,633,064

CONTAINER MAKING MACHINE

Michel Welstein, Tirlemont, Belgium

Application December 8, 1949, Serial No. 131,751
In Belgium April 27, 1949

21 Claims. (Cl. 93—44)

The introduction

This invention relates to a new type of machine for manufacturing containers. More particularly, it deals with a continuous machine for making containers from sheet-stock by forming or bending said stock around mandrels or forms, such as for example, in the manufacture of cardboard five-sided or tray-shaped boxes and/or their lids.

Previously, continuous machines for manufacturing such containers comprised a reciprocating mandrel or container-form or a plurality of mandrels attached to a wheel or conveyor which moved through a series of operation stages for successively forming the container about the mandrels. Such machines, however, are large and complicated and have considerable space between each operation stage to accommodate the forming mechanisms for each stage; all of which produces a machine having considerable inertia and which in turn limits the speed of its operation.

The objects

It is an object of this invention to produce an efficient and effective machine for continuously making containers from sheet-stock which is comparatively light, compact, rapid and does not jam.

Another object is to produce such a machine having freely moving and unattached container forming mandrels.

Another object is to produce such a machine having a comparatively low inertia and in which the distance between successive operation stages is limited only by the dimensions of the container it produces.

The invention

In accordance with this invention, the machine comprises a group of unattached or freely guided container-forming mandrels which are moved along a path by pushing one mandrel against another. These mandrels may be guided to slide along their edges and their path of movement may be continuous or cyclic. The sheet from which the containers are made is fed intermittently into one part of the path between two adjacent mandrels, and then the stock is clamped between said two mandrels and pushed along the path where at different stages it has its sides folded and/or formed around one of said two mandrels after which said mandrel is removed from the completed container and recycled. The mandrels may be moved step by step by one or more reciprocating pushers and/or pullers which act on each mandrel in turn to ratchet them along their guided path. For example, in the case of a rectangular path, a pusher or puller may be provided at each corner to push all of the mandrels in front of it along one side of the path.

In addition to the unattached-mandrel container-forming mechanism, the machine of this invention may also include in synchronism therewith, a sheet-stock preparation mechanism, which for example in the case of card-board for boxes, may comprise means for feeding the sheet-stock from a continuous roll through means for gumming or gluing those portions of the sheet which are to be stuck together, and means for shaping the stock into blanks for the forming mechanism such as means for creasing, punching out, and/or cutting the stock into the proper lengths and shapes and then intermittently feeding the stock into said container forming mechanism. If desired, by proper synchronism of the parts the sheet of stock may not be cut to length from the strip of stock by the stock preparation mechanism, until after the stock is clamped between two mandrels of the container forming mechanism. Thus, with such a sheet-stock preparation mechanism in combination with the unattached mandrel container-forming mechanism, the compact and complete synchronized unit may be produced in which unprepared stock may be fed in at one end of the machine and completed tray-shaped boxes may be ejected at the other.

The drawings

The above mentioned and other features and objects of this invention and the manner of attaining them will become more apparent and the invention itself will be best understood by reference to the following description of an embodiment of the invention taken in conjunction with the accompanying drawings, wherein:

Fig. 1 is a side elevational view, with parts broken away, of one form of a machine embodying this invention for making card-board tray-shaped boxes from roll-stock;

Fig. 2 is the shape of a box blank formed in the sheet-stock preparation portion of the machine of Fig. 1;

Fig. 3 is a left end view, with parts broken away, of the machine in Fig. 1;

Fig. 5 is an oblique view, with parts broken away, of the box forming mandrel cycle shown in Fig. 3.

The description

Figure 4:
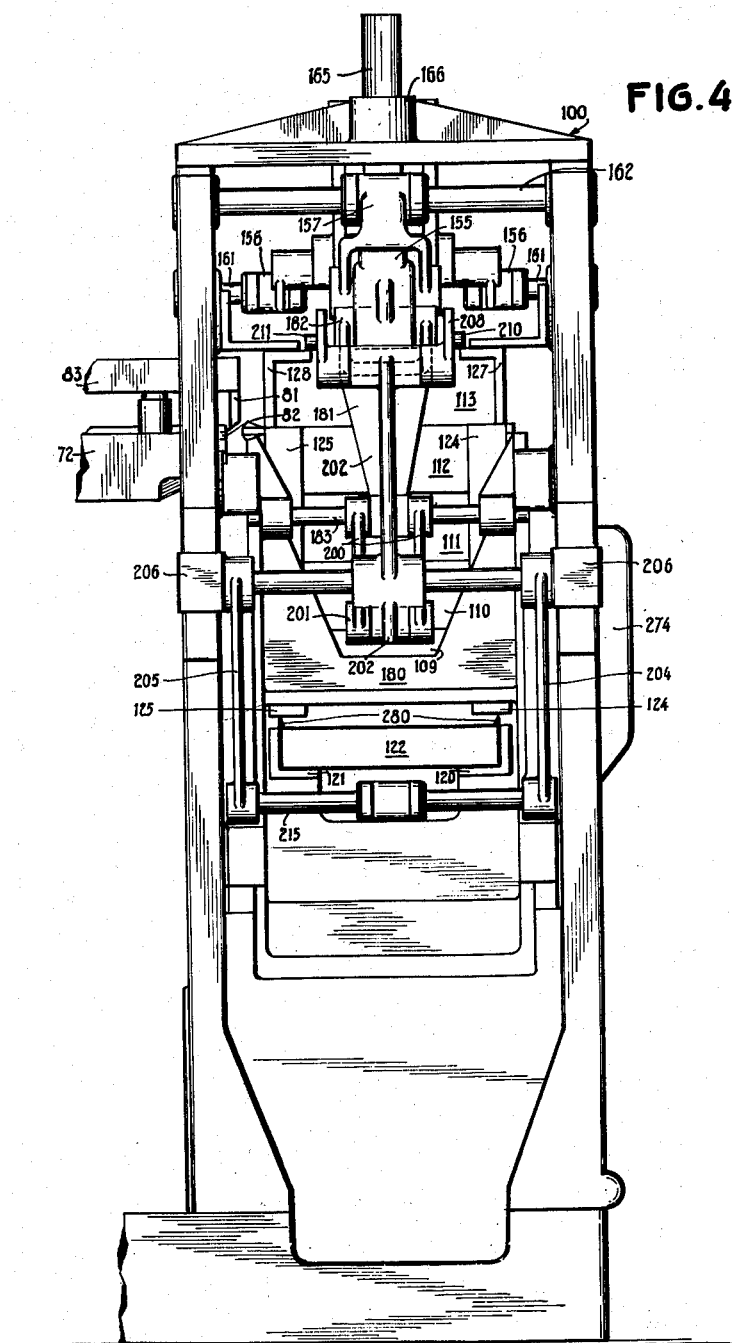
Fig. 4 is a partial left side view only of the container-forming portion of the machine shown in Fig. 3.

To illustrate this invention, there is shown in the drawings a complete machine for producing tray-shaped boxes from a roll of card-board sheet stock, which includes both a sheet preparation portion and a box forming portion. The following description of this machine may be divided into the following sections:

I. Driving mechanism
II. Sheet stock preparing mechanisms
    1. Continuous stock feeding
    2. Gluing
    3. Intermittent stock feeding
    4. Blank shaping
III. Container forming mechanisms
    A. Mandrel and cycle operations
        1. The unattached mandrels and their path
        2. Mandrel moving devices
            a. Down pusher
            b. Up lifter
            c. Top horizontal pusher
            d. Bottom horizontal pusher
    B. Box forming operations
        1. Clamping and side folding
        2. Flap folding
        3. End folding and pressing
        4. Ejecting completed containers
        5. Returning mandrels.

I. DRIVING MECHANISM

Referring to Fig. 1 the driving mechanism for the whole machine is shown to be taken from one main shaft 10 which is mounted transversely of the machine and also is provided with cranks or eccentrics (not seen) for operating the sheet stock creasing, punching and cutting mechanism 70, and the container pressing mechanism which will be described later. On this shaft 10 there may be mounted a screw gear 11 which intermeshes with a screw gear 12 for driving a shaft 15 mounted along the outside of the machine, which shaft 15 through the means of bevel gears 16 and 17, drives an end shaft 18 for controlling the intermittent feed mechanism for the sheet stock. Also, shaft 15 through the means of a safety releasing crank 20 and an eccentric 21, drives the mandrel cycle and the box forming mechanism 100. Also on shaft 10 may be mounted a spur gear 25 which, through a series of other spur gears 26, 27, 28 and 29, drives the sheet stock feeding rollers and the gluing rollers of the stock preparation portion of the machine. Since shaft 10 is the main driving shaft for the whole machine one or the other ends thereof is connected to a power source, such as for example, by means of a belt drive 9 to an electric motor. An advantage of having the whole machine including the sheet stock preparation, the box forming, and the stock feeding mechanisms driven from one main shaft resides in the ease of synchronizing all of the moving parts of the machine for rapid and accurate operation.

II. SHEET STOCK PREPARING MECHANISMS

1. *Continuous stock feeding.*—In the machine shown in Fig. 1, cardboard from which the boxes are made may be supplied from a roll 30 which may be mounted at one end of the machine in a stirrup 31; or on a separate unattached spindle, as desired. The sheet stock or material 32 is shown herein to be fed up through the bottom of the right-hand sheet-stock preparation portion of the machine shown in Fig. 1 under fixed guide roller 33 and a redressing or sheet straightening means 34, and then between the two rollers 35 and 36, one of which, 36, is affixed to the shaft 37 driven by spur gear 27, and the other of which, 35, is adjustably spring pressed against the driven roller 36 for pulling the stock 32 from the roll 30 and feeding it into the machine.

2. *Gluing.*—After the stock 32 passes over roller 35 and under roller 36 it may pass along a relatively horizontal reach 40 over the top of the segmented gluing roller 41 driven by spur gear 29 and maintained wet with glue by contacting the chain of two gluing rollers 42 and 43, the latter of which dips into a trough 44 of the liquid glue or adhesive. The portion of the gluing mechanism comprising the two rollers 42 and 43 and the trough 44 may be mounted so that it may be easily slid or withdrawn from the other side of the machine from that shown in Fig. 1 for cleaning and refilling with glue. The strip of material in trace 40 is held against the segments of the gluing roller 41 by two parallel rollers 45 and 46, between which the material 32 is tensioned (as shown by the contacting segments of the roller 41) so that if the sheet stock tears or breaks, the glue from the segments will not contact the rollers 45 and 46 so they will have to be cleaned before operation can be continued. The gluing segments are so arranged on the roller 41 that only those portions on the sheet stock which are to be contacted and stuck together in the later container forming mechanism 100, will be glued. For example in Fig. 2, the glued portions 47 appear on the ends 48 of the box blanks which will be bent up and stuck against the previously bent in side flaps 49.

3. *Intermittent stock feedings.*—The strip of stock 32, after being glued, may pass around the horizontally reciprocating roller 50 and back along horizontal trace 51 between two additional and faster turning feeding rollers 52 and 53, one of which, 52, is rotated through spur gear 27 and the other of which, 53, is urged by its own weight or by means of an adjustable spring, toward roller 52 to hold the stock 32 against roller 52 by friction so that the stock will always be held taut around the roller 50. The friction engaging roller 53 should only contact the now upper surface of the strip of stock 32 in paths which do not cross the glued portions 47 on the strip, and therefore this roller 53 may comprise a pair of narrow rollers or discs which only contact the outer edges of the strip of stock 32. Thus, the roller 52 alternately slips over the under surface of the strip of stock 32 when the reciprocating roller 50 is moving outwardly to stop the feed of the stock, and then rapidly feeds the proper length of stock into the creasing and punching mechanism 70 when the roller 50 is moving inwardly toward this mechanism. The rate and amplitude of the reciprocating movement of the roller 50 determines the length of time that the sheet of stock is stopped and the amount of said stock and the speed at which it is fed into the mechanisms 70 and 100.

The roller 50 is herein shown to be mounted on one end of an L-shaped lever 54, on the other end of which is mounted a cam follower 55. This lever 54 may be the main lever of an Evans lever system for converting arcuate motion into straight line reciprocating motion for the roller 50. Accordingly, this lever 54 is suspended by two other parallel pairs of levers 56 and 57 which are connected to the lever 54 at pivots 58 and 59 and fixed to the frame 60 of the machine at pivots 61 and 62, respectively. However, another type of lever device may be employed, such as a simple lever with an arcuate motion, in that it is not essential here that the movement of the roller 50 must be in a straight line. The cam 65 for operating this lever 54 may be mounted on the transverse end shaft 18 driven from shaft 10 through shaft 15, and the cam follower 55 on the lever 54 may be maintained in contact with the cam 65 by the action of a spring 66, which may be attached between the other end of the lever 54 and the top of the frame 60. Thus, as the cam rotates in synchronism with the other parts of the machine, the roller 50 reciprocates in a straight line from one dotted line position to the other, as shown in Fig. 1, which alternately stops the continuous movement of the sheet stock 32 into the punching and creasing mechanism 70 for a sufficient time for this mechanism to operate, and then permits the stock to be fed into the mechanism the length of the next container blank to be creased and punched, as well as simultaneously feeds the previously and already creased and punched blank 85 into the mandrel cycle of the container forming mechanism 100.

4. *Blank shaping.*—The strip 32 in the present machine is now fed into the shaping mechanism 70 between two die plates 71 and 72 one of which, 72, may be stationary and the other of which, 71, reciprocates vertically by the action of a parallel pair of connecting rods 73 between it and a crank (not shown in the drawings) on shaft 10. Thus, each revolution of the shaft 10, causes the plate 71 to descend and punch the slots 74 (see Fig. 2), in the strip of a stock and simultaneously crease the box blank along the lines 75 and 76 (see Fig. 2) along which it is to be folded in the box forming mechanism 100. The punch for the slots 74 may be located at 77 on the die 71 and the creasing edges may be located at 78 and 79 for the perpendicularly crossing creases 75 and 76, respectively.

After the strip 32 is so shaped by the slots 74 and creases 75 and 76, its end is fed into the forming mechanism 100, between side grooved guide channels 91 and 92 (see Figs. 3 and 5) and across the cyclic path of the mandrels in said mechanism 100. Then, during the succeeding descent of the die 71 to shape the following blank, the end or formed blank 85 which has been fed into the guides 91 and 92 may be severed or cut from the strip 32 by the cooperating knife edges 81 and 82. The knife edge 81 may be attached to the die plate 71 by means of extension 83, so that it may operate therewith. This cut, in the machine described, is through the center of the slots 74 and group of four glued spots 47 along the line 84 shown in Fig. 2. The blank 85 which is thus cut from the strip 32, preferably is not cut until it is held between two identical adjacent mandrels of the box forming mechanism.

III. CONTAINER FORMING MECHANISMS
A.—MANDREL AND CYCLE OPERATIONS

1. *The unattached mandrels and their path.*—The principal feature of this invention resides in the construction and operation of the container forming mechanism 100 comprising essentially a continuous path for closely guided free or unattached identical mandrels or container-forms which substantially fill the channel of the path. In the specific embodiment disclosed for the formation of rectangular, five-sided or tray-shaped boxes or box lids, there are provided, as seen in Figs. 3 and 5, a rectangular path having two parallel vertical sides of sufficient length for six rectangular mandrels each, one on top of the other, and two parallel horizontal sides of sufficient length for three mandrels each, one beside the other. This is about the shortest length of path practical to perform the operations required and to return the mandrels, in that only one of the longer sides of the path is used in forming the box, and the other three sides are added merely to remove the finished boxes from the path and return the mandrels. Thus, the path contains fourteen mandrel spaces filled by twelve mandrels 102 to 107 and 109 to 114 corresponding to the spaces which they are shown to occupy in the path of Fig. 5.

Each of the mandrels may comprise a rigid box form having outside dimensions equal to the inside of the container to be made around it. These mandrels are preferably made hollow to reduce their weight and may be made of a light metal, such as aluminum, with a harder metal, such as of steel, inserted at the edges and/or where the most rubbing and wear occurs. By making the mandrels tough and light, their wear and momentum is decreased and the speed with which they can be moved is increased.

These mandrels are moved step by step in this path in a clockwise direction as indicated by arrows 117 (see Figs. 3 and 5). Side plates 118 and 119 and the folding and pressing mechanisms, guide the mandrels along the first downward trace of the path, and angle guides 120 and 121 support the mandrels across the bottom of the path and also extend out to the left to form an ejection chute for the completed boxes 122. The returned mandrels are guided upwards along the left side of the path by angle guides 123, 124, 125 and 126 along the corners of the path, and then back horizontally across the top of the path over the top of guide 92 and between angle pieces 127 and 128. The right end of these pieces 127 and 128 may be provided with aligned beveled extensions 129 and 130 (see Fig. 5) which fit into the grooves 131 and 132 along the ends of each mandrel to support the mandrels in succession over the space between the sheet-blank guides 91 and 92, while the blank is being inserted into the path of the mandrels. These extensions 129 and 130 may be resiliently maintained in position by means of springs 133 and 134 which retract when the downward mandrel pusher 140 pushes the mandrel down out of engagement with the extensions 129 and 130 into the position of mandrel 102 shown in Fig. 5.

2. *Mandrel moving device.*—These mandrels are pushed or pulled one against the other, by lever operated dogs or fingers which engage the end mandrels at each one of the four corners of the rectangular path and push it together with all of the mandrels along a corresponding side of the path each time the lever is operated. The mandrel moving levers are so arranged that any pair of opposite sides of the rectangular path are moved simultaneously in opposite directions, and alternately with the other pair of opposite sides.

All four of the separate pushers and pullers are operated by the same main cycle driving connecting rod 150 connected to the crank 20 at the end of the shaft 15 (see Fig. 1) by means of release clutch device 151. This clutch may be adjusted to release the crank 20 so it will slide in the cross head of the device 151 at any increase degree of pressure or force applied to it not required to move the mandrels around the cycle. Thus, as soon as any piece jams in the mandrel circuit, the whole lever system for moving the mandrels around their path will immediately be stopped and its drive released.

*a. Down pusher.*—The main rod 150 is pivotally connected to a floating bifurcated lever 155 which may be of the Evans type as previously described. Such lever 155 is shown to be suspended by a pair of parallel levers 156 and a bifurcated lever 157 which are connected to the lever 155 at pivots 158 and 159 and to fixed pivots on the frame 160 of portion 100 at 161 and 162, respectively. Near the right end of the lever 155 there is pivotally connected the first downward pusher 140 which is guided in a vertical reciprocating path by rod 165 sliding in the bearing 166 fixed in the top of the frame 160. This pusher 140 may be provided with a locking device 167 to prevent its rotation about its pivotal connection 168 until the device 167 is contacted by the side of the next mandrel 114 (see Fig. 5) as it is moved to the right to be pushed under the pusher 140. Thus, as this mandrel is moved, it unlocks the pivot for the pusher 140 so that the pusher 140 may pivot out of the way and slide up the inclined cam surface 169 on the top-right side of each mandrel, so as not to block or delay the movement of the mandrels in the cycle. While the pusher is being raised again to a position above the new positioned mandrel 114 in Fig. 3, the pusher is urged back into its vertical position by means of a leaf spring 170 (see Fig. 5) which may be affixed to the rod member 165. If desired, to aid in the alignment of the pusher 140 with the centers of the tops of the mandrels, the pusher may be provided with a rounded end 171 which fits into a similarly rounded groove 172 in the top of each mandrel (see Fig. 3 and mandrels 113 and 114 in Fig. 5).

Thus, each time the main cycle driving rod 150 makes one oscillation, the pusher 140 makes one reciprocation to push the stack of mandrels in the right side of the path down at least the distance of the thickness of one mandrel, and prepare a space at the top of the column or stack for the next proceeding mandrel to be pushed into said space from the left along the top side of the path.

*b. Up lifter.*—The means at the opposite corner of the path, which moves simultaneously with the pusher 140, is a device which lifts the mandrels from the completed containers at the lower left corner of the path, and also lifts the column or stack of mandrels, above the one being removed from the finished container, at least the distance of the thickness of one mandrel. This is accomplished by a vertically reciprocating plate 180 (see Fig. 4) sliding in channels in the frame 160 and moved through a link 181 pivotally connected at 182 to the left end of the lever 155 and to the sliding plate 180 at pivot 183 (see Figs. 3 and 4).

This reciprocating plate 180 carries two parallel horizontal extensions 184 (and 185 not seen) (see Figs. 3 and 5) which extend along opposite ends of the mandrels in the path. These extensions 184 and 185 each carry spring engaging pawls 186 (and 187 also not seen) that engage the grooves 131 and 132, respectively, of each mandrel, when the plate 180 is in its lowest position, to grasp the mandrel and lift it from the completed container 122 which is retained in channels 120 and 121 as will be explained later. At the top of the stroke or movement of the plate 180 additional pairs of spring engaging pawls 188 (and 189 not seen) fixed to the guides 123, 124, 125 and 126, fall into the grooves 131 and 132 of the just lifted mandrel to hold it into the position of mandrel 109 as well as to support all the four other mandrels resting on the top of the mandrel 109. These pawls 186, 187, 188 and 189 are designed to engage in one direction of movement only, so that downward movement of the pawls 186 and 187 will cause them to be released from the grooves 131 and 132, while the pawls 188 and 189 will hold the mandrel 109 in the position shown; but pawls 188 and 189 will permit upward movement of the mandrel 109 when the next mandrel pushes it up to take its place.

*c. Top horizontal pusher.*—The other two corners of the path are provided with mandrel pushers which operate 180° out of phase with the two vertically moving pushers just described. These horizontal pushers move the mandrels horizontally the distance of the width of one mandrel each oscillation of the main rod 150 and may be operated simultaneously by being connected to the same lever system just described through a pair of links 200 from the pivot 183 on the sliding plate 180, to pivot 201 on one arm of an L-shaped lever 202 keyed to a rocking shaft 203 journalled in a pair of brackets 206 mounted on frame 160. Keyed to this same shaft 203 is a pair of parallel levers 204 and 205, which together with the lever 202 form a rocking lever system as best shown at the left in Fig. 3. To the top end of the L-shaped lever 202 there may be pivotally connected at 207 a bifurcated pusher member 208 which may be provided with a pair of rollers 210 and 211 which ride along the top of the guides 127 and 128, thereby keeping the pusher end 212 at an even distance below the top edge of the mandrels during its advancing movement. The pivoted connection at 207 permits the pusher end 212 to ride over the top of the next mandrel lifted from the stack of mandrels along left side of the path, as it appears before the pusher 208 reaches its retracted position.

*d. Bottom horizontal pusher.*—The lower ends of levers 204 and 205 are joined by a bar 215 at the center of which may be connected a link rod 216 (see Fig. 3) which is connected on the right side of the frame 160 at pivot 217 to the free and upper end of a supporting lever 218 pivoted at its lower end to the bar 219 fixed to the frame 160. Also pivoted at 217 is a bifurcated pusher dog 220, the pusher ends 221 of which may be held up into engaging position by means of a spring 222 connected to the other end of the dog 220 at 223, and also may be limited in its movement by slot 224 in link 225 connected between the same other end 223 and a special rigid member 226 mounted on bar 219. The dog 220 is pivoted so it may be moved out of the way of the next descending mandrel, as it does not reach its retracted position before the mandrel 106 moves into the position shown in Fig. 5.

Thus, as the rocking lever system at the left side of the machine shown in Fig. 3 operates, the top horizontal row of mandrels is simultaneously pushed to the right substantially the width of one mandrel by pusher 208 while the lower row of mandrels is pushed the same distance to the left by dog 220.

Fig. 3 shows the horizontal pushing levers 208 and 220 in their extended positions as distinguished from Fig. 5 wherein they are shown in their retracted positions. Similarly, in Fig. 5 the vertical pusher 140 and lifter 180 are in their extended positions and in Fig. 3 these same members are shown in their retracted positions.

B.—BOX FORMING OPERATIONS

1. *Clamping and side folding.*—Returning now to the box forming steps in the cycle of freely moving mandrels just described, the first downward push of the lever 140 first clamps the end of the strip 32 between two adjacent mandrels (see Fig. 5), immediately after which the operation of the mechanism 70 cuts the blank 85 from the strip. Then the clamping mandrels are further pushed downwardly to the position of mandrels 102 and 103 shown in Fig. 5, wherein the two long sides of the blank 85, including their end flap portions 49, are bent up into the positions shown in Fig. 5 between the two side plates 118 and 119. These side plates 118 and 119 may be tightly held against the stack of mandrels by means, such as spring engaging means 230 shown in Fig. 3.

2. *Flap folding.*—The next oscillation of the cycle driving mechanism moves the mandrel into the position of mandrel 103 where the flaps 49 at each end of the bent-up long sides are folded inwardly toward each other over the ends of the mandrel. This is done by four separate folding fingers 240, 241, 242 (and 243 not seen in the figures), which are operated simultaneously by a separate crank or eccentric 21 near the left end of shaft 15 (see Figs. 1 and 3). A connecting rod 244 from this eccentric 21 links with arm 245 pivoted to the frame 160 on shaft 246, to which shaft are keyed a pair of similar rocking levers 247 and 248, spaced on said shaft 246 a distance slightly greater than the length of a mandrel, so as to freely operate push and pull rods 250, 251, 252 (and 253 not seen) controlling the folding fingers 240, 241, 242 and 243, respectively, through connecting extensions 255, 256 (and two extensions not seen on the drawings). The left ends of each of the rods 250, 251, 252 and 253 may be guided by separate pivoted levers 258, 259 (260 and 261 not seen) one end of each lever being pivoted to the frame on a bracket 262, and the other ends of each of the levers being pivoted to the ends of the rods 250, 251, 252 and 253, respectively. Since all of the four folding fingers 240, 241, 242 and 243 have separate control rods connected to corresponding sides of a pair of rocker levers 247 and 248, the fingers 240 and 242 are pushed into operating position simultaneously with the fingers 241 and 243.

3. *End folding and pressing.*—Before the four flap folding fingers have had time to completely retract to their inoperative positions, the downward pusher 140 has started to move the vertical column of mandrels down into the next positions so that the top edges of the end pressing plates 270 and 271 have started to fold up the ends 48 of the box blank, carrying the glued spots 47, against the folded-in flaps 49. As soon as the mandrel has been moved into the position of mandrel 104, a relatively extreme pressure, say of about 1000 kilograms, may be applied between the plates 270 and 271 to press the freshly glued spots into adhesive contact with the flaps 49 to hold the box or container together. This pressure may be exerted by a lever 272 (see Figs. 1 and 3) pivoted at 273 to a special bifurcated reinforcing bracket 274 mounted in the frame 160. The lever 272 may be pivotally connected to one of the pressing plates 270 at 275 near the fixed pivot 273 to give as much power advantage as possible. The lower end of the lever 272 is connected to a link 278 by means of a pin 279 projecting into a slot 276 in said link 278. A very strong tension spring 277 is connected between the end of the lever carrying projecting pin 279 and the side of the operating link 278, so that the pressure to the ends of the mandrels is only applied through the spring 277 which exerts a great pressure for a small distance of movement. When the link 278 is moved to the right, this spring pulls the lever 272 to press the ends of the mandrels between plates 270 and 271, and when the link is in its "left" position and the spring is not under tension, the plate 270 is released to permit movement of the mandrels. Thus, the ends of the box are pressed twice under extreme pressure in successive positions to insure adhesion of the glued spots with the flaps so that the box will permanently stick together. The extreme pressure employed has an added advantage of forcing the glue into the pores of the cardboard of which the box is made and thereby increasing the adhesion of the parts. The lever 278 may be connected to an eccentric or crank (not shown) on the main drive shaft 10 adjacent the crank which operates the mechanism 70 so as to be synchronized with all the other movements of the whole machine and insure release of the pressure plates 270 and 271 during the time when the cycle driving pusher 140 is being operated.

4. *Ejecting completed containers.*—After release of the pressure plates 270 from stationary plate 271, the mandrel and container formed around it is then pushed into the last vertical position shown to be occupied by mandrel 106 along the bottom row of the cyclic path, and then it is moved to the left after two oscillations of the pusher dogs 220, to the bottom of the left side vertical stack of mandrels shown in the cycle. When in this position, the pawls 186 and 187 mounted on the vertical sliding member 180 descend and engage the grooves 131 and 132 along the top edges of the ends of the mandrels and lift the mandrel from the finished container or box 122. The container is prevented from sticking to the mandrel, or is scraped off the mandrel, by the sharp edges or shoulders 280 which may be provided on the inside of the members 123, 124, 125 and 126. These shoulders (see Figs. 4 and 5) are preferably, in width, not over twice the thickness of the material of the box (end piece 48 and flaps 49) which thickness occurs at its ends where these shoulders are located. These shoulders are located a little above the normal height of the box so as only to be engaged by boxes sticking to their mandrels and not interfere with the free passage of the completed boxes as they are pushed out one by one each successive operation along the extended lower angle guides 120 and 121 projecting out from the left side of the machine as shown in Fig. 3. Since the machine when in operation produces at least two completed boxes every second, means should be provided to take these boxes away as rapidly as they are formed.

5. *Returning mandrels.*—The mandrels as they are lifted from the completed cartons or boxes are lifted one by one up the left side of the cyclic path shown, until they reach the position of mandrel 113 in Fig. 5. This lifting is done each successive oscillation of the means 184 and 185 carrying the pawls 186 and 187 as explained above, and during each downward movement of the means 184 and 185 the mandrels already lifted are held and prevented from descending by the latching pawls 188 and 189 fixed to the vertical guides 123, 124, 125 and 126. From the position of mandrel 113 in Fig. 5, the mandrels are pushed, one by one, across the top of the cyclic path until they are in a position beneath the pusher 140 and above a box blank which has just been inserted between the guides 91 and 92. At this time they start again downthe right side of the cyclic path acting as forms for more containers or boxes.

The equivalents and conclusions

Although the foregoing description has been directed to a complete synchronized machine for the production of cardboard boxes from a roll of strip cardboard, the principal feature of this invention, i. e. the cycle of contacting unattached mandrels, may be applied in other machines for producing containers of the type described, or it may be employed alone without including the preparation of the roll stock into blanks as 85, but such blanks may be prepared in another machine or machines and fed directly into the container formation cycle identified in general as portion 100 of the machine described.

The same principles employed in the machine described may be employed for controlling and moving any size and practically any shape of mandrels for different types of containers, so long as the mandrels have two parallel surfaces which could contact each other so that the mandrels may be pushed one against the other along the cycle path. The sides or guides for the path, however, may take any desired shape to fit different shaped boxes, such as flat hexagonal boxes, round boxes, etc. Such a machine may be applied to the production or forming of almost any taype of container, from any kind of sheet material, including sheet metal, paper, flexible plastic sheets, or the like, as well as cardboard.

An advantage of the present machine besides its compactness and speed, lies in the ease in which the mandrels can be removed or replaced in the case of wear, damage, jamming, or the like. Also since all of the mandrels are identical for any one machine for making one kind of container, spare mandrels may be kept for emergency and may be inserted quickly without requiring the whole machine to be shut-down until a damaged mandrel is repaired or remade.

The cyclic path of the unattached mandrels need not necessarily be rectangular in shape or have sides of the length disclosed. Longer top and bottom traces may be employed in which one or more operations may be performed on the container around the mandrel, and shorter side traces may be employed providing for fewer operations. Also, the cyclic path need not be vertical as shown, but may be horizontal, or at any desired angle. It also may take many different turns of right or other angles. Such a change in the cyclic path may increase or decrease the number of means to push and/or pull the mandrels around the path. The corners or bends in the path may be rounded, particularly those in that portion of the path for the return of the mandrels which structure would reduce the necessity of a pusher at such a bend. Also ratcheting pushers of the type shown may be placed in the middle or between the ends of a straight stretch of path, if required.

Other folding, pressing, forming, and the like operations may be performed in the cycle of the unattached mandrels in the portion 100 of the machine shown, if desired, or fewer of such operations may be performed, for example one of the pressing stages for sticking the glued ends against the flaps 47 may be eliminated.

Concerning the sheet preparation portion of the machine described, any one or all of the operations performed in that portion of the machine may be eliminated, such as the intermittent feed mechanism in that the glue may operate along the intermittently moving part of the sheet instead of the continuously moving part; or further or different preparatory operations may be inserted, such as replacing the gluer with a printing or inking device or adding along the trace 40 such a printing device which may be operated similarly to that of the gluer.

While there is described above the principles of this invention in connection with specific apparatus, it is to be clearly understood that this description is made only by way of example and not as a limitation to the scope of this invention which is directed to a machine having a plurality of contacting unattached mandrels guided along an operational path.

What is claimed is:

1. In a machine for forming containers from sheet stock by folding said stock around mandrels moving in a vertical cyclic path, the improvement comprising: a plurality of freely moving mandrels, guide means forming a vertical cyclic slide path in which said mandrels move, means feeding said stock into the top of said path between two adjacent mandrels, a plurality of means each pushing one mandrel and said one mandrel pushing another to move said mandrels in said path, reciprocating fingers and guide means along the downward part of said path to form said containers, and means to remove the resulting formed containers from said mandrels at the bottom of said path.

2. The machine of claim 1 wherein said mandrels are composed of light metal with hard wear engaging edges.

3. A machine for forming containers having at least one open side, comprising: a plurality of freely moving mandrels around which sheet stock for said containers is formed, a slide track forming a vertical cyclic path for said mandrels, means to push one mandrel and said one mandrel pushing another and adjacent mandrel to move said mandrels along said track, means for inserting and holding said sheet stock between two adjacent mandrels in said track near the top of said path, means to fold the stock projecting beyond the edges of said mandrels around one of the two mandrels between which mandrels the stock is held along the downward reach of said track, means to remove said mandrels from the resulting formed containers and to eject said containers from said track near the bottom of said path, and means to lift and recycle said mandrels in said track around said path.

4. The machine of claim 3 wherein said folding means includes a plurality of separate reciprocate fingers which operate simultaneously and intermittently.

5. The machine of claim 3 wherein said mandrels contain notches, and said means to remove said mandrels from the completed containers comprises pawls which engage said notches to pull said mandrels from said containers.

6. The machine of claim 5 wherein said pawls are connected to said lifting and recycling means.

7. A machine for forming containers having at least one open side, from sheet stock comprising: a plurality of freely moving container-forming mandrels, means forming a vertical path for guiding said mandrels therealong, first pusher means pushing one mandrel and said one mandrel pushing another mandrel to move a plurality of said mandrels along said path, feeder means inserting a container blank of said sheet stock between two adjacent mandrels at one point along said path, said first pusher means clamping said blanks between two adjacent mandrels, finger and guiding means folding the overhanging edges of said blank around one of said two blank clamping mandrels as said mandrels are moved downwardly along said path, container engaging means removing said mandrels from the resulting formed containers at a bottom point along said path, and second pusher means for lifting and returning said mandrels to said first mentioned point along said path.

8. The machine of claim 7 wherein said guide means form a path which is rectangular in shape and wherein at least one said pusher means comprises a ratchet-type stepping means located at a corner of said rectangular path.

9. The machine of claim 8 including pusher means to move said mandrels around said path at each of the four corners of said rectangular path.

10. The machine of claim 9 including means to operate said pusher means at diagonally opposite corners simultaneously and alternately with the pusher means of the other two corners.

11. The machine of claim 9 wherein said first mentioned point along said path is located at one of said corners.

12. The machine of claim 11 including resilient means at said point to maintain said two adjacent mandrels apart a sufficient distance for the insertion of said sheet blank before the operation of said first pusher means which clamps said blank between said two adjacent mandrels until the container forming operations are completed.

13. The machine of claim 7 wherein said blank contains glued spots, and wherein said folding means includes means for pressing said glued spots to adjacent folded positions of said blanks to hold said containers together.

14. The machine of claim 7 wherein said guiding means includes a spring tensioning means to urge at least one of said guiding means to maintain said containers around said mandrels and in position along said path until said mandrels are moved by said pushing means.

15. The machine of claim 7 comprising a common driving means for all of said pusher and feeder means for synchronizing the movements of the mandrels along said path with the operations on said mandrels.

16. A machine for forming tray-type containers from sheet stock comprising: a plurality of freely moving mandrels around which said containers are formed, guide means to guide said mandrels in a cyclic path, means to feed sheet stock having glue portions into said path at one point between two adjacent mandrels, means to clamp said stock between said two mandrels, means to cut said sheet stock into the length of container blanks after said stock is clamped, means to push one of said mandrels and said one mandrel pushing at least one other of said mandrels along said path, means along said path to fold the edges of said cut blanks around the sides of said mandrels, means to press the resulting folded blanks to stick said glue portions to hold the folded portions together, and means to remove the resulting formed containers from said path at another point.

17. A machine for forming tray-shaped containers from a roll of flexible sheet material comprising: means to feed said material into said machine, means to put glue portions on said material, a shaping device for creasing and punching slots in said material, means to feed said material intermittently into said shaping device, and means to form the resulting prepared sheet material around mandrels to form containers comprising: a plurality of freely moving identical mandrels, means to guide said mandrels one touching the other around a cyclic path, means at one point in said path to insert and clamp said prepared sheet material between two adjacent mandrels, means operated by said shaping means to cut off a blank of said prepared sheet material from the roll of said material after being clamped between said adjacent mandrels, means to push one mandrel and said one mandrel pushing another mandrel to move said mandrels step by step along said path, reciprocating finger means to fold the overhanging edges of said blank clamped between two adjacent mandrels around one of said two adjacent mandrels, means to press the folded edges together to stick the glue in said portions to contacted parts of said material of said blank to hold said container together, means to remove said mandrels from the resulting formed containers, and means to recycle said mandrels around said path to form more of said containers.

18. The machine of claim 17 including a common driving shaft for synchronizing all of the operations of the means of said machine.

19. The machine of claim 17 wherein said path is vertical and rectangular in shape and wherein said means to step said mandrels around said path comprises separate pusher means pushing at each corner of said rectangular path.

20. The machine of claim 19 wherein diagonally opposite corner pushing means operate simultaneously and alternately with the pushing means of the other two corners of said path.

21. A machine for forming containers from a strip of sheet stock, comprising: guides forming a path, a plurality of freely moving container-forming mandrels movable in said path, means to push one mandrel and said one mandrel pushing at least one other mandrel to move said mandrels in said path, resilient means at one point along said path to maintain two adjacent mandrels apart a sufficient distance for the insertion of said stock between said two adjacent mandrels, means to feed an end of said stock between said two adjacent mandrels before said pusher means pushes said two adjacent mandrels together clamping said stock between them, means to cut off a blank from said strip of stock after said strip is clamped between said two adjacent mandrels, means along said path to form said stock around said mandrels, and means to remove the resulting formed containers from said mandrels and said path.

MICHEL WELSTEIN.

REFERENCES CITED

The following references are of record in the file of this patent:

UNITED STATES PATENTS

| Number | Name | Date |
| --- | --- | --- |
| 852,974 | Mitchell | May 7, 1907 |
| 1,001,319 | Staderini | Aug. 22, 1911 |
| 1,009,236 | Giroud | Nov. 21, 1911 |
| 1,140,915 | Redd | May 25, 1915 |
| 1,220,566 | Schroeder | Mar. 27, 1917 |
| 1,862,390 | Schmiedel | June 7, 1932 |
| 1,920,810 | Schmiedel | Aug. 1, 1933 |
| 1,957,957 | Hartman | May 8, 1934 |
| 1,965,161 | Sheflin | July 3, 1934 |